April 11, 1967 G. VOGEL 3,313,886

V-F KEY-DIALLING

Filed July 2, 1963

INVENTOR

GEORG VOGEL

BY P.A. Weiss

ATTORNEY

United States Patent Office 3,313,886
Patented Apr. 11, 1967

3,313,886

V-F KEY-DIALLING

Georg Vogel, Schwieberdingen uber Ludwigsburg, Germany, assignor to International Standard Electric Corporation, New York, N.Y., a corporation of Delaware Filed July 2, 1963, Ser. No. 292,261
Claims priority, application Germany, July 17, 1962, St 19,491
5 Claims. (Cl. 179—16)

Figure 1:
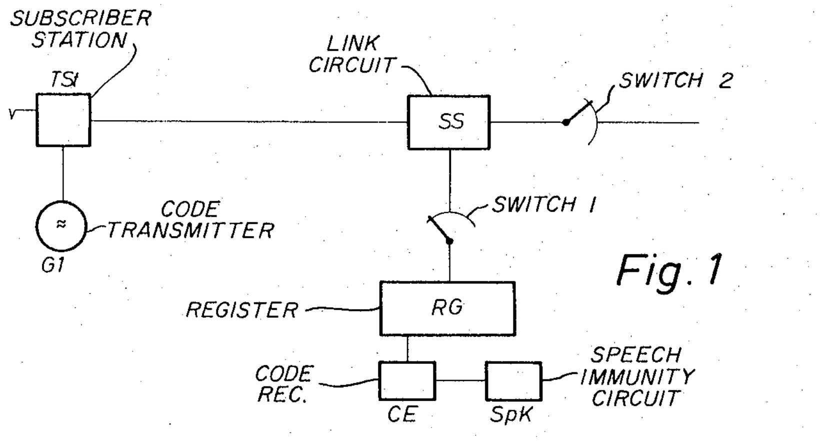

The invention relates to telephone systems and more particularly to voice frequency keyed code signal receivers for use in such systems; wherein dial pulse supervisory signals are not used and speech immunity circuits are used. The receiving device is located in a dial pulse pick-up device, such as a register, and evaluates the voice frequency dial information transmitted from the subscriber station.

The known voice frequency key-dialling equipment may be classified into two groups. The distinction between the two groups is in the design of the speech immunity facilities. One group uses a separate dial pulse supervising signal parallel to the code signal that, for practical purposes, cannot be imitated by speech frequencies. The code receiver is turned on to be ready for reception responsive to the receipt of the unique dial pulse supervisory signal. Among the shortcomings of this group is that extra equipment is required to supply the separate dial pulse supervisory signal transmitter at the subscriber station. In addition, the signalling speed is reduced by the necessity of evaluating and recognizing the dial pulse supervisory signal.

To overcome these shortcomings, the second group of voice frequency signalling equipment provides speech immunity in the receiving device itself instead of using dial pulse supervisory signals. Signalling frequency groups separated from each other are particularly suitable for the second group. Therein only one frequency of each group participates in the code signal and the receivers are equipped with speech immunity circuits. The equipment of the second group, however, may, in case of a speech line leading via the register, be adversely influenced from the outgoing line end. The code signal emitted by the subscriber can be cancelled, suppressed or split up by voltages arriving from the outgoing line end leading to a wrong dialling. The trouble cannot be avoided by using a hybrid to connect the code receiver because the hybrid balance is not sufficient when operating the dial pulse pick-up devices via the different lines.

The audible signal emission can also interfere in the receiving device. This interference is caused because the frequency of the audible signals is within the frequency range which effects a high attenuation of the receiver.

The object of the invention is to provide receiving devices with speech immunity code receivers for voice frequency keyed code signals which are not disturbed by either the voltages from the outgoing line or the audible frequencies of the dial tone generator.

The receiving devices, according to the invention, are characterized in this that the code receivers in the dial pick-up device are constantly ready for reception. The speech immunity circuits of the receivers, however, are switched on a short time after registering a signal frequency. At the time the outgoing line and dial tone generator circuits are opened so that any influence on the code receivers by the outgoing line and by the dial one generator is avoided. When a genuine code signal is registered during this time, the signal end is supervised via the code receivers and the outgoing line remains blocked. In that way, the speech immunity effect of the receiving device is maintained for evaluation of the code signals and the possibility of interference by voltages from the outgoing line is eliminated. The short time interruptions of the speech connection during signalling can be tolerated, because these periods are essentially smaller than dialling pulses.

If a code signal is registered during the interruption period, the speech immunity circuit remains switched-on according to the invention and the signal end is supervised via the output conditions of the code receivers. As soon as the code receivers are switched off or the genuine code signal disappears the speech immunity circuits are switched off again. The code signals must appear and exist for minimum duration during the interruption time, that is, when the speech immunity circuits are switched to the on condition.

In order to make this minimum signal duration nearly as large as the shortest possible signal duration a further embodiment of the invention provides that the signal duration is extended for a defined time after switching-off of the code receivers in the receiving device.

The above mentioned and other features of this invention and the manner of obtaining them will become more apparent, and the invention itself will be best understood by reference to the following description of an embodiment of the invention taken in conjunction with the accompanying drawings, in which:

FIG. 1 shows in block diagram form the signalling devices; and

Figure 2:
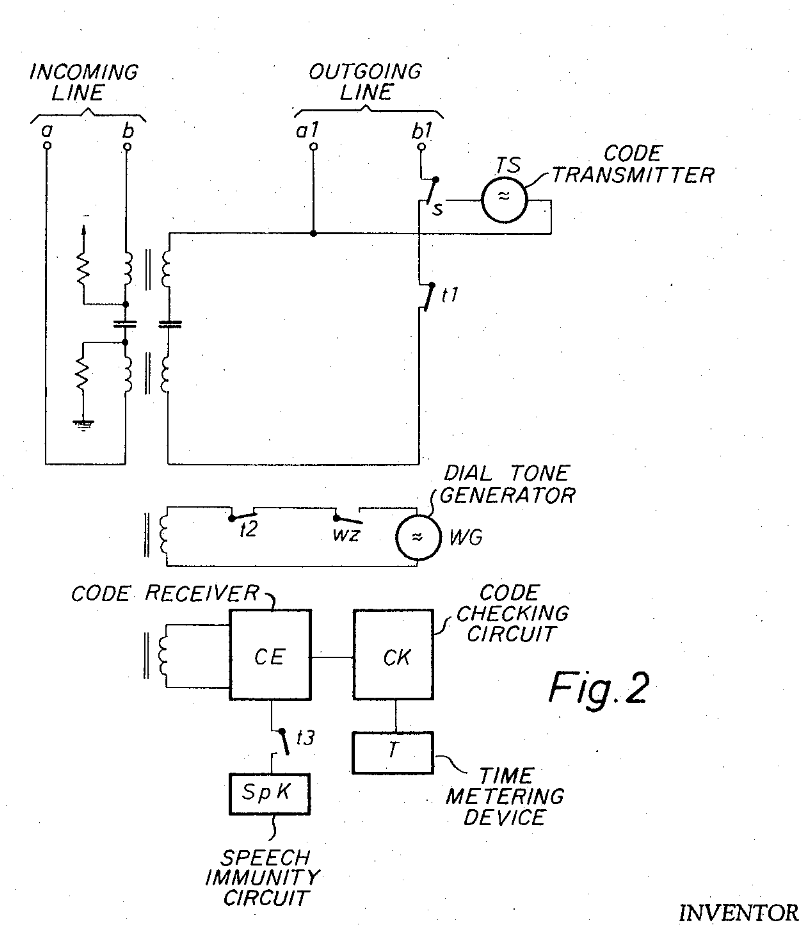

FIG. 2 schematically and in blocks shows the receiving device according to the invention.

FIG. 1 shows the subscriber station TS*t* with the code transmitter G1. This code transmitter may be, for example, two oscillators which are set onto two different signal frequencies via the key contacts. By this "2-out-of-5" code, ten digits can be represented. The register RG in the exchange office is connected via a feeding circuit SS. The register contains the code receivers CE with the speech immunity circuits S*p*K.

The mode of operation of the FIG. 2 showing of the receiving device, according to the invention, is explained with the aid of FIG. 2. In the register RG, only the devices are shown which are provided to pick up and retransmit the code signals from the subscriber station. The code signals reach the disconnecting transformer of the register via the line *a*, *b*. The code receiver CE is operated via a secondary winding. If a signal frequency or a genuine code signal is on the line the associated voice-frequency receivers in receiver CE respond. This signal is used to close contact *t*3 to switch on the speech immunity circuits S*p*K for a certain time controlled by a time metering device T. The closure of contact *t*3 connects the speech immunity circuit S*p*K to the receiver CE. At the same time the influence of the outgoing line *a*1, *b*1, and of the dial tone generator WG on the code-receiver is interrupted through the contacts *t*1 and *t*2 respectively. During the time determined by the time metering device T, only the voltages from the subscriber station can influence the code receivers. By the effect of the switched-on speech immunity circuits only a genuine code signal can render, via code checking device CK, an indication of a properly transmitted information. During signal transmission the speech current circuit is out of operation on the calling end. If a genuine code signal is registered within the time determined by the time metering device T the speech immunity circuits S*p*K remain switched on and the outgoing line is disconnected until the end of the code signal is indicated at the code checking device CK.

If the code checking device CK operates while the time metering device T is functioning, the switching condition of said device T remains until the "proper" indication at the code checking device disappears. Evaluation and/or registration of a code signal during the operation time of the time metering device T is achieved only if while the speech immunity circuits SpK is switched on, a genuine signal is indicated by the code checking device CK within a predetermined period. This period may be extended to encompass nearly the entire time period of the smallest signal duration, if on the receiving end, the indication from the code checking device CK disappears only after a certain delay.

At the end of the signal the speech immunity circuits are switched off again. If the receiving device responds at any one time to the voltages from the outgoing line *a*1, *b*1, the device will automatically block the outgoing line and then automatically reset after the definite time period when the time metering device T returns to its normal unoperated condition. No code signal will be stored, because during the evaluation period no "proper" indication appears via the code checking device CK. The switching on and off of the speech immunity circuits assure that only genuine code signals emitted from the subscriber station are stored and that no influence occurs from the outgoing line *a*1, *b*1. With this signalling method it is only to be considered that the frequency combinations provided as genuine signals do not occur solely within the speech. An improvement of the speech immunity is obtained also by the above described, additional protective time during evaluation.

FIG. 2 further shows how the code signal re-emitted by the register is fed to the line. During signalling via the code transmitter TS any influence on the code receivers CE of the register is prevented by contact *s*.

While the principles of the invention have been described above in connection with specific apparatus and applications, it is to be understood that this description is made only by way of example and not as a limitation on the scope of the invention.

What is claimed is:

1. A voice frequency key telephone dialing system wherein subscriber stations are equipped for transmitting coded dialing signals in the voice frequency range over telephone lines, register means coupled to incoming ones of said telephone lines for picking up said coded signals, code receiver means in said register means, said code receiver means normally in a condition to receive said coded signals, timing means operated responsive to the receipt by said receiver means of signals at the frequency of said coded signals, speech immunity means associated with said code receiver means, first means operated responsive to the operation of said timing means for connecting said speech immunity means to said coded receiver means for a definite time period for muting said receiver means if speech signals are received over said incoming lines, second means operated responsive to the operation of said timing means for disconnecting said outgoing lines whereby the receipt of said dial signal is disconnected by voltages on said outgoing lines and means for checking said signals received by said code receiver means while said speech immunity means is connected to said receiving means to determine whether said received signal at said frequency of said coded signal is a dialing signal.

2. The voice frequency key dialing system of claim 1 wherein tone generator means for generating dial tone signals are associated with said register means, and wherein third means are provided operated responsive to the operation of said timing means for inhibiting said tone generator means whereby said dial tone does not interfere with the recepit of said dial signals.

3. The voice frequency key dialing system of claim 1 wherein disconnect transformer means are used to connect said code receiving means to said incoming and outgoing ones of said telephone lines.

4. The voice frequency key telephone dialing system of claim 3 wherein code transmitter means are provided in said register means for retransmitting said code signals over said outgoing lines, and means for disconnecting said code receiver means from said outgoing lines during the said retransmitting.

5. The voice frequency key dialing system of claim 4 wherein said definite time period is shorter than the shortest signal dialing time.

References Cited by the Examiner

UNITED STATES PATENTS

| | | | |
|---|---|---|---|
| 3,114,005 | 12/1963 | Kuhn | 179—84 |
| 3,128,349 | 4/1964 | Boesch et al. | 179—84 |
| 3,140,357 | 7/1964 | Bischof et al. | 179—84 |

KATHLEEN H. CLAFFY, *Primary Examiner.*

H. ZELLER, *Assistant Examiner.*